(12) United States Patent  
Khayrallah et al.

(10) Patent No.: US 8,750,432 B2  
(45) Date of Patent: Jun. 10, 2014

(54) METHOD AND APPARATUS FOR A WIRELESS COMMUNICATION RECEIVER USING SERIAL LOCALIZATION WITH INDECISION

(75) Inventors: Ali Khayrallah, Mountain View, CA (US); Michael Samuel Bebawy, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/545,630

(22) Filed: Jul. 10, 2012

(65) Prior Publication Data

US 2014/0016726 A1    Jan. 16, 2014

(51) Int. Cl.  
H04L 27/06    (2006.01)

(52) U.S. Cl.  
USPC ........... 375/340; 375/229; 375/341; 375/232; 375/148

(58) Field of Classification Search  
CPC .................................................. H04B 7/0413  
USPC .......................... 375/340, 229, 341, 232, 148  
See application file for complete search history.

(56) References Cited

U.S. PATENT DOCUMENTS

| | | | | |
|---|---|---|---|---|
| 8,559,543 B1* | 10/2013 | Lee et al. | ...................... | 375/267 |
| 2007/0198719 A1* | 8/2007 | Su et al. | .......................... | 709/226 |
| 2008/0310556 A1* | 12/2008 | Lee et al. | ...................... | 375/340 |
| 2010/0254446 A1* | 10/2010 | Khayrallah et al. | .......... | 375/232 |
| 2011/0051795 A1 | 3/2011 | Khayrallah | | |
| 2011/0051796 A1* | 3/2011 | Khayrallah | .................. | 375/232 |
| 2011/0051851 A1 | 3/2011 | Khayrallah | | |
| 2011/0051852 A1 | 3/2011 | Khayrallah | | |
| 2011/0051853 A1* | 3/2011 | Khayrallah | .................. | 375/340 |
| 2011/0096873 A1* | 4/2011 | Khayrallah | .................. | 375/340 |
| 2011/0103528 A1 | 5/2011 | Khayrallah | | |
| 2011/0243283 A1 | 10/2011 | Wang et al. | | |
| 2011/0255638 A1 | 10/2011 | Khayrallah et al. | | |
| 2011/0261872 A1 | 10/2011 | Wang et al. | | |
| 2012/0027139 A1 | 2/2012 | Khayrallah et al. | | |

FOREIGN PATENT DOCUMENTS

WO    2012027139 A2    3/2012

OTHER PUBLICATIONS

Anderson, J. B., et al. "Sequential Coding Algorithms: A Survey and Cost Analysis." IEEE Transactions on Communications, vol. COM-32, No. 2, Feb. 1984.

(Continued)

*Primary Examiner* — Sam K Ahn  
*Assistant Examiner* — Fabricio R Murillo Garcia  
(74) *Attorney, Agent, or Firm* — Murphy, Bilak & Homiller PLLC

(57) ABSTRACT

In one aspect, the present disclosure provides an advantageous generalization of a SLIC receiver structure, by allowing multiple solutions to survive at any one or more of the serial stages included in the SLIC receiver. Where any given stage produces multiple solutions, the next stage of the SLIC receiver processes those multiple input solutions to produce multiple output solutions. Consequently, the contemplated SLIC receiver effectively builds a tree structure with as many levels as there are stages in the SLIC receiver. Such operations allow the SLIC receiver to form two or more solution threads spanning the stages, and to make an improved overall demodulation decision for a received symbol vector by selecting the best solution thread. Further, the additional complexity of allowing multiple survivor solutions at one or more SLIC stages is controlled in one or more embodiments, using survivor pruning for example.

21 Claims, 8 Drawing Sheets

(56) References Cited

OTHER PUBLICATIONS

Grant, S. J., et al. "Reduced Complexity Joint Detection Generalized RAKE Receiver for WCDMA MIMO Systems." 2005 IEEE 61st Vehicular Technology Conference, vol. 1, May 30-Jun. 1, 2005.

Hochwald, B. M., et al. "Achieving Near-Capacity on a Multiple-Antenna Channel." IEEE Transactions on Communications, vol. 51, No. 2, Mar. 2003.

Khayrallah, A. "SLIC: A Low Complexity Demodulator for MIMO," Vehicular Technology Conference (VTC Fall), 2011 IEEE; Sep. 5-8, 2011. pp. 1-5. San Francisco, California, US.

Bottomley, G.E., et al., "A Novel Multistage Group Detection Technique and Applications," IEEE Transactions on Wireless Communications; Aug. 2010. pp. 2438-2443; vol. 9, No. 8.

\* cited by examiner

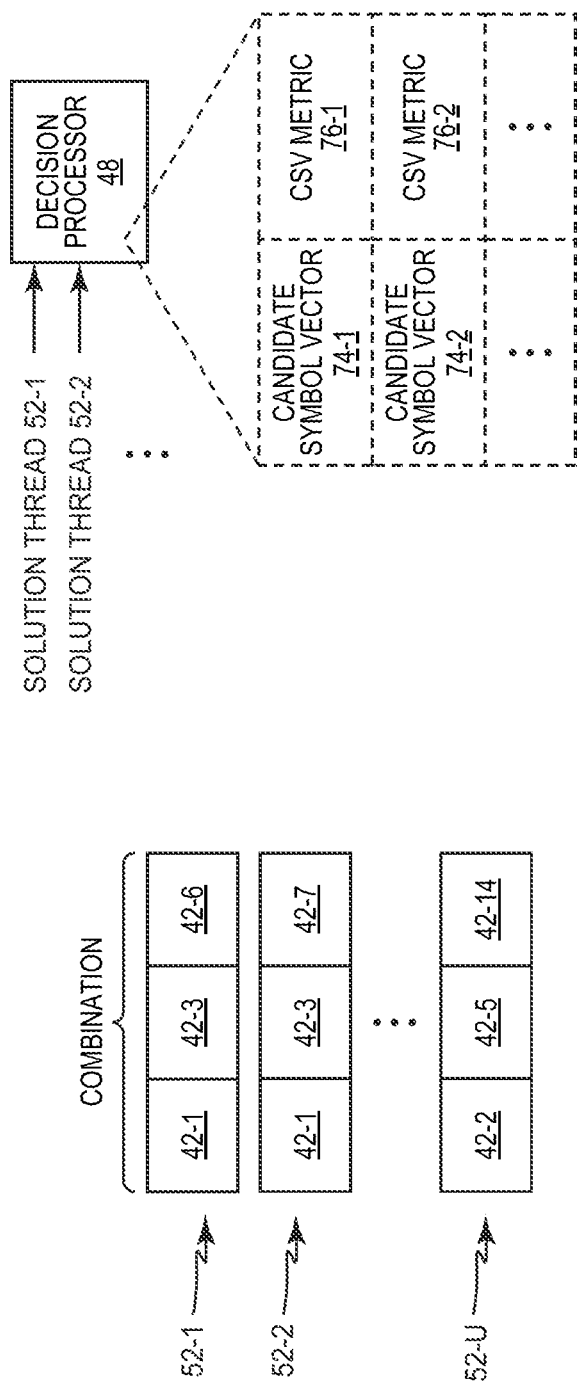

METHOD AND APPARATUS FOR A WIRELESS COMMUNICATION RECEIVER USING SERIAL LOCALIZATION WITH INDECISION

TECHNICAL FIELD

The present invention generally relates to wireless communications, and particularly relates to wireless communication apparatuses using Serial Localization with Indecision ("SLIC") based demodulation.

BACKGROUND

The acronym "SLIC" refers to one approach to addressing the complexities associated with demodulating high-data rate signals, with their generally higher-order modulation constellations. SLIC, or "Serial Localization with Indecision," uses a multi-stage receiver structure, where the individual stages each operate on a simplified (reduced-order modulation) constellation rather than the full-order modulation constellation(s) associated with the symbols in a received symbol vector.

As noted, SLIC receivers are multi-stage, serial receivers, where each stage includes a joint processing unit. While not limited to Multiple-Input-Multiple-Output (MIMO) scenarios, SLIC represents a particularly advantageous type of reduced-complexity demodulator for MIMO-based receivers. In a MIMO system with N transmit streams, the joint processing unit in a given SLIC stage performs a full search over all candidate N-tuples of centroids. Each centroid represents a subset of symbols from the actual modulation constellation(s) used for transmitting the symbol vector.

The use of centroids creates a residual signal, which belongs to a finite set. The residual signal is effectively modeled as a colored Gaussian noise, having a covariance that is derived from the channel coefficients. Further, the search metric in the joint processing function is the Euclidean metric, with a total covariance that includes that of the residual signal. In a "conventional" SLIC formulation, the joint processing unit at a given SLIC stage produces a unique solution, which is accounted for in the input signals propagated from that given stage to the next stage. Thus at a stage i, the previous (i−1) solutions are unique, and accounted for in its input. With this in mind, it will be appreciated that a key feature of SLIC is the use of overlapping signal subsets. This overlap mitigates the effect of incorrect decisions in early stages on later stages.

Various examples of SLIC receiver structures and associated SLIC processing are known. For example, the interested reader may refer to any one or more of the following published U.S. patent applications: US20110051795A1, US20110051796A1, US20110051851A1, US20110051852A1, US20110051853A1, US20110096873A1, US20110103528A1, US20110243283A1, US20110255638A1, US20110261872A1, and US20120027139A1, all of which are incorporated by reference herein. However, in the interest of presenting helpful background details within this disclosure, consider a conventional SLIC receiver, including a joint processing unit (i.e., a joint demodulator or detector that jointly detects symbols) in each serial stage.

For the MIMO scenario and joint detector, one may consider the N×N case, where there are N transmit antennas and N receive antennas—e.g., a 2×2 MIMO scenarios. For a non-dispersive channel, the received signal is $$r = Hc + n. \quad (1)$$

Here r, c and n are N×1 vectors, and H is a N×N matrix. The components of H are independent and Rayleigh faded, and n is white Gaussian noise with covariance R. Further, for this example, assume that all N signals are from the same constellation Q of size q, and all N signals are transmitted with the same power. The effective constellation for c is of size $q^N$.

The optimal receiver in this scenario conducts a full search over all $q^N$ candidates $\bar{c} = (\bar{c}_1, \ldots, \bar{c}_N)^T$ in $Q^N$ for one that minimizes the metric $$D(\bar{c}|r,R) = (r - H\bar{c})^H R^{-1} (r - H\bar{c}), \quad (2)$$

where subscript T indicates the transpose, and subscript H indicates the Hermitian, or conjugate transpose. The best candidate is denoted $\hat{c}$.

The general idea of SLIC is to represent the symbols in a transmitted symbol vector by a series of approximations. In an L-stage SLIC, the symbol vector is effectively represented as $$c = c^{[1]} + \ldots + c^{[L]}, \quad (3)$$

where stage i detects component $c^{[i]}$, using an effective alphabet $Q^{[i]}$ derived from the true alphabet Q.

While a good general formulation of SLIC-based receiver processing appears in US20110051851A1, as listed above, a few key characteristics are worth expanding herein. To with, in the first stage of a SLIC receiver, the true alphabet Q used for transmission of the symbol vector is approximated by a set of centroids $Q^{[1]}$, of size $q^{[1]} < q$. Note that Q is also referred to herein as the "actual modulation constellation" for the received symbols of interest.

Each centroid represents a subset of Q. Moreover, the subsets have three properties: (1) the subsets overlap; (2) their union is equal to Q; and (3) all the subsets are shifted versions of the same set $O^{[1]}$ of size $o^{[1]}$, with centroid equal to zero ("0"). The centroid overlap property is a key ingredient, as it enables the indecision feature of SLIC, which in turn boosts demodulation performance.

If L>2, in the second stage $O^{[1]}$ plays the role of Q. That is, $O^{[1]}$ is approximated by a set of centroids $Q^{[2]}$, of size $q^{[2]}$, with the same three properties listed above and based on a set $O^{[2]}$ of size $o^{[2]}$, with centroid 0. We proceed similarly for all stages except the last.

For the last stage L, there is no more approximation, thus $Q^{[L]} = O^{[L-1]}$, and $O^{[L]}$ is empty. The outcome consists of the sets $Q^{[1]}, \ldots, Q^{[L]}$, which serve as the effective constellations for the L stages of the SLIC receiver.

Consider, for example, the 16-QAM constellation. An example SLIC processing approach "covers" the 16-QAM constellation with four overlapping subsets. This approach is shown in FIG. 1. Each subset is a shifted version of 9-QAM, so that $O^{[1]}$ is 9-QAM. The four respective centroids correspond to 4-QAM or QPSK, so $Q^{[1]}$ is 4-QAM. In a two-stage SLIC receiver, $Q^{[1]}$ serves as the constellation of stage 1, and $Q^{[2]} = O^{[1]}$ as the constellation of stage 2. One may refer to this subset design and to the corresponding SLIC receiver as (4,9).

One may also choose to cover the set $O^{[1]}$ itself with four overlapping subsets, such as shown in FIG. 2. Each subset is a shifted version of 4-QAM, so that $O^{[2]}$ is 4-QAM, as is shown in FIG. 3. The four respective centroids are shown as circles, and also correspond to 4-QAM, so one sets $Q^{[2]}$ to be 4-QAM. In a 3-stage SLIC, $Q^{[1]}$, $Q^{[2]}$ and $Q^{[3]} = O^{[2]}$ serve as the constellations of stages 1, 2 and 3, respectively. One may refer to this subset design and to the corresponding SLIC receiver as (4,4,4).

Note that these subset designs are not unique. For instance, the paper by A. Khayrallah, "SLIC—A Low Complexity Demodulator for MIMO," Proc. IEEE VTC-Fall, 2011, presents a number of subset designs for 16, 64 and 256-QAM.

Marrying the above details to an example SLIC receiver, FIG. 4 depicts stage i of a known SLIC receiver architecture. The stage input signal is the modified received signal $r^{[i-1]}$ from prior, i.e., the stage (i−1). Of course, for the first stage, the stage input signal is the (starting) received signal of interest. Stage i assumes that the components $c^{[1]}, \ldots, c^{[i-1]}$ have been determined in earlier stages, and focuses on the demodulation of $c^{[i]}$. The (stage) residual signal $$b^{[i]} = (c^{[i+1]} + \ldots + c^{[L]}) \quad (4)$$

belongs to the set $O^{[i]}$. Stage i models $Hb^{[i]}$, the residual signal filtered by the channel, as a colored Gaussian noise, with covariance $$\epsilon^{[i]} H H^H \quad (5)$$

where $\epsilon^{[i]}$ is the average energy of the set $O^{[i]}$.

One problematic aspect here is that useful knowledge about $O^{[i]}$ is not being exploited, which is among a number of advantages attending particular embodiments of the present invention. In any case, note that $\epsilon^{[i]}$ decreases as the stage index i grows because there is less and less of the received signal being demodulated that is unaccounted for in the demodulation process as processing progresses through the successive, serial stages of the stages of the SLIC receiver.

The total noise has covariance $$R^{[i]} = \epsilon^{[i]} H H^H + R \quad (6)$$

The joint processing unit—i.e., the joint detection unit in each stage—conducts a full search over constellation $Q^{[i]}$. It searches over all $(q^{[i]})^N$ candidates $\bar{c}^{[i]}$ in $(Q^{[i]})^N$ for the one that minimizes the metric $$D(\bar{c}^{[i]} | r^{[i-1]}, R^{[i]}) = (r^{[i-1]} - H\bar{c}^{[i]})^H (R^{[i]})^{-1} (r^{[i-1]} - H\bar{c}^{[i]}) \quad (7)$$

which is modified from (2) by replacing R with $R^{[i]}$, and the received signal r with the modified received signal $r^{[i-1]}$.

Assuming that stage i is not the last stage, the stage generates as re-modulated signal as $\hat{r}^{[i]} = H\hat{c}^{[i]}$ and then forms a modified received signal for propagation to the next stage as a stage output signal. The modified received signal is expressed as $$r^{[i]} = r^{[i-1]} - H\hat{c}^{[i]}, \quad (8)$$

which is fed to the next stage, denoted as stage (i+1). So, each stage i except for the first stage, receives as its stage input signal the modified received signal $r^{[i-1]}$ provided as the stage output signal from the prior stage (i−1). Further, each stage i except for the last stage, outputs its own stage-specific modified received signal $r^{[i]}$, as the stage output signal to be provided to the next stage (i+1) as the $r^{[i-1]}$ stage input signal at that next stage.

As for the first stage where i=1, its stage input signal is the original received signal r. Further, in a non-limiting example of the SLIC architecture, the last stage where i=L, the constellation $Q^{[L]}$ is a subset of Q. Because there is no next stage after the L-th stage, there is no need for a re-modulation block in the L-th stage.

The overall symbol decision made by the SLIC receiver for the received symbol vector is found by adding all the intermediate stage decision vectors $\hat{c}^{[i]}$ output from each of the SLIC receiver stages. As such, the overall symbol decision is expressed as $$\hat{c} = \hat{c}^{[1]} + \ldots + \hat{c}^{[L]}. \quad (9)$$

The serial arrangement of successive SLIC stages and the overall SLIC structure are shown in FIG. 5.

Note that stage i is affected by the sequence of (i−1) unique previous decisions $(\hat{c}^{[1]}, \ldots, \hat{c}^{[i-1]})$. This can be seen by writing the input $r^{[i]}$ in (8) explicitly as $$r^{[i]} = r - H(\hat{c}^{[1]} + \ldots + \hat{c}^{[i-1]}) = r - H\hat{s}^{[i-1]} \quad (10)$$

where the decision state of the SLIC receiver at the output of stage i−1 is $$\hat{s}^{[i-1]} = \hat{c}^{[1]} + \ldots + \hat{c}^{[i-1]}. \quad (11)$$

Thus, $\hat{s}^{[i-1]}$ summarizes the impact of all preceding stage decisions, i.e., $(\hat{c}^{[1]}, \ldots, \hat{c}^{[i-1]})$. One may therefore think of $\hat{s}^{[i-1]}$ as the "state" of the SLIC receiver at the end of processing for stage i−1.

Because of the subset overlap feature, it is possible that a different sequence of candidates $(\bar{c}^{[1]}, \ldots, \bar{c}^{[i-1]})$ also satisfies the same value $$(\bar{c}^{[1]}, \ldots, \bar{c}^{[i-1]}) = \hat{s}^{[i-1]}, \quad (12)$$

meaning that $(\bar{c}^{[1]}, \ldots, \bar{c}^{[i-1]})$ would have the same impact as $(\hat{c}^{[1]}, \ldots, \hat{c}^{[i-1]})$ on stage i. Furthermore, the effect of $(\bar{c}^{[1]}, \ldots, \bar{c}^{[i-1]})$ is the same as $(\hat{c}^{[1]}, \ldots, \hat{c}^{[i-1]})$ on the eventual solution, i.e., the overall symbol decision $\hat{c}$ in (9). As such, they are interchangeable for purposes of this explanation, thus confirming the notion of $\hat{s}^{[i-1]}$ as the state of SLIC receiver. Notably, at the input to each stage i, there is only one surviving value of the state $\hat{s}^{[i-1]}$ provided by the previous stage i−1.

SUMMARY OF THE INVENTION

In particular embodiments, the present invention advantageously generalizes the SLIC receiver structure, by allowing multiple solutions to survive at any one or more of the serial stages included in the SLIC receiver. Where any given stage produces multiple solutions, the next stage of SLIC receiver processes those multiple input solutions to produce multiple output solutions. Consequently, the contemplated SLIC receiver effectively builds a tree structure with as many levels as there are stages in the SLIC receiver. Such operations allow the SLIC receiver to form two or more solution threads spanning the stages, and to make an improved overall demodulation decision for a received symbol vector by selecting the best solution thread. Further, the additional complexity of allowing multiple survivor solutions at one or more SLIC stages is controlled in one or more embodiments, using survivor pruning for example.

In one or more embodiments, a wireless communication apparatus includes a SLIC receiver that is configured to demodulate a received symbol vector conveyed in a received signal. The SLIC receiver includes a set of two or more serial stages. Each stage is configured to output at least one stage decision vector representing a stage-specific demodulation solution for the received symbol vector according to a stage-specific modulation constellation. More particularly, at least one stage is configured to output more than one stage decision vector, thus providing two or more surviving solutions at that stage.

Correspondingly, each stage except for the last stage is configured to propagate to a next stage one or more modified received signals. Each modified received signal comprises, if the stage is the first stage, the received signal as modified by the stage to account for a particular one of the one or more stage decision vectors output by the first stage. Otherwise, if the stage is not the first stage, each stage output signal comprises one of the one or more modified received signals propagated from the prior stage, as modified by the (current) stage to account for a particular one of the one or more stage decision vectors output by the (current) stage, for the corresponding modified received signal provided to the (current) stage.

Because at least one stage of the SLIC receiver produces two stage decision vectors, the SLIC receiver can be understood as producing at least two solution threads. Each solution thread comprises a different combination of the stage decision vectors taken across the set of two or more serial stages. That is, each solution thread is a different combination of stage decision vectors taken across all stages of the SLIC receiver, with one such stage decision vector from each stage.

Still further, the SLIC receiver includes a decision processor that is configured to generate two or more candidate symbol vectors for the received symbol vector, from respective ones of two or more of the solution threads. Each such candidate symbol vector represents an overall demodulation solution for the received symbol vector and the decision processor is configured to identify a best one of the candidate symbol vectors and to output the best candidate symbol vector as the overall demodulation solution for the received symbol vector.

In one or more other embodiments, a method of demodulating a received symbol vector conveyed in a received signal includes outputting at least one stage decision vector from each stage in a series of two or more stages of a SLIC receiver. More particularly, the method includes outputting at least two stage decision vectors (two survivor solutions) from at least one of the stages of the SLIC receiver. Each stage decision vector represents a stage-specific demodulation solution for the received symbol vector according to a stage-specific modulation constellation.

The method further includes each but the last stage propagating to the next stage a modified received signal for each of the one or more stage decisions by the stage. Here, each modified received signal output by a given stage is formed as a function of a corresponding one of the stage input signals received by the stage and corresponding one of the one or more stage decision vectors generated by the stage for that corresponding stage input signal. For the first stage there is only one stage input signal, namely, the received signal conveying the received symbol vector.

Still further, the method includes forming two or more solution threads as different combinations of stage decision vectors. Each different combination being formed by taking one stage decision vector from each of the stages in the SLIC receiver. Correspondingly, the method includes generating a candidate symbol vector for at least two of the two or more solution threads, evaluating the candidate symbol vectors to identify a best one of the candidate symbol vectors, and outputting the best candidate symbol vector as an overall demodulation solution for the received symbol vector.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 11 is a diagram of example solution threads formed by a SLIC receiver as contemplated herein.

FIG. 12 is a block diagram of one embodiment of a decision processor, which is configured to evaluate multiple solution threads, as produced in the SLIC receiver of FIG. 8 or FIG. 10, for example.

DETAILED DESCRIPTION

Figure 6:
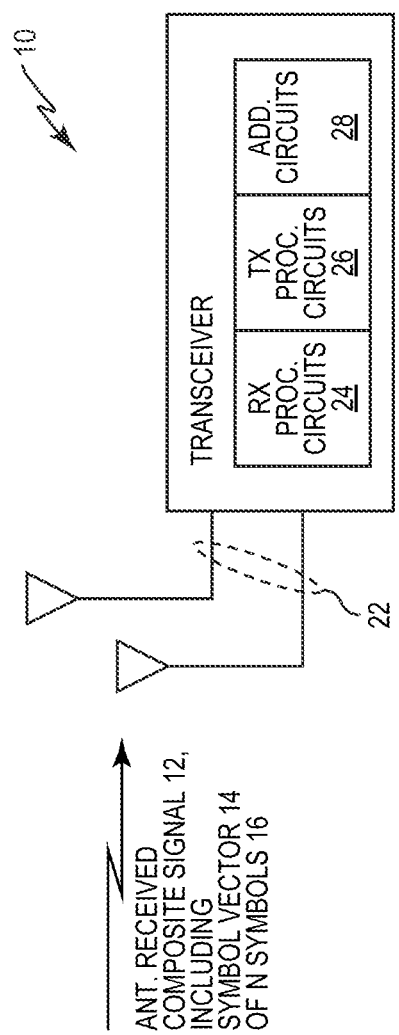
FIG. 6 is a block diagram of one embodiment of a wireless communication apparatus that is configured as a transceiver for operation in a wireless communication network.

FIG. 6 illustrates a wireless communication apparatus 10 that receives a "composite" signal 12 that includes or otherwise conveys a symbol vector 14 of N symbols 16. As a non-limiting example, the composite signal 12 carries multiple data streams or other multiple components, each of which conveys one or more symbols 16 in one or more repeating symbol transmission times. As a particular non-limiting example, the composite signal 12 is a MIMO transmission signal that includes multiple data streams, each data stream conveying information symbols transmitted according to, e.g., 16-QAM and/or 64-QAM symbol constellations.

The wireless communication apparatus 10 is, in an example embodiment, configured for use in a wireless communication network—e.g., the wireless communication apparatus 10 comprises a cellular telephone or other wireless communication apparatus configured to receive downlink (DL) signals from a wireless communication network and to send uplink (UL) signals to that network. Correspondingly, for operation as a wireless transceiver, the wireless communication apparatus 10 includes a number of antennas 22 for receiving the composite signal 12, and further includes receiver processing circuits 24, transmitter processing circuits 26, and may include additional circuitry 28.

The nature and extent of the additional circuitry 28 depends on the intended use and particular implementation of the wireless communication apparatus 10, and may include "system" type microprocessors, memory, and user interface components, such as display screens, keypads, touchscreens, etc. Of course, the present invention is not limited to handsets or other remote terminal devices, and may be incorporated into or implemented by other types of receivers, such as those used in the radio network nodes of a wireless communication network.

Figure 1:
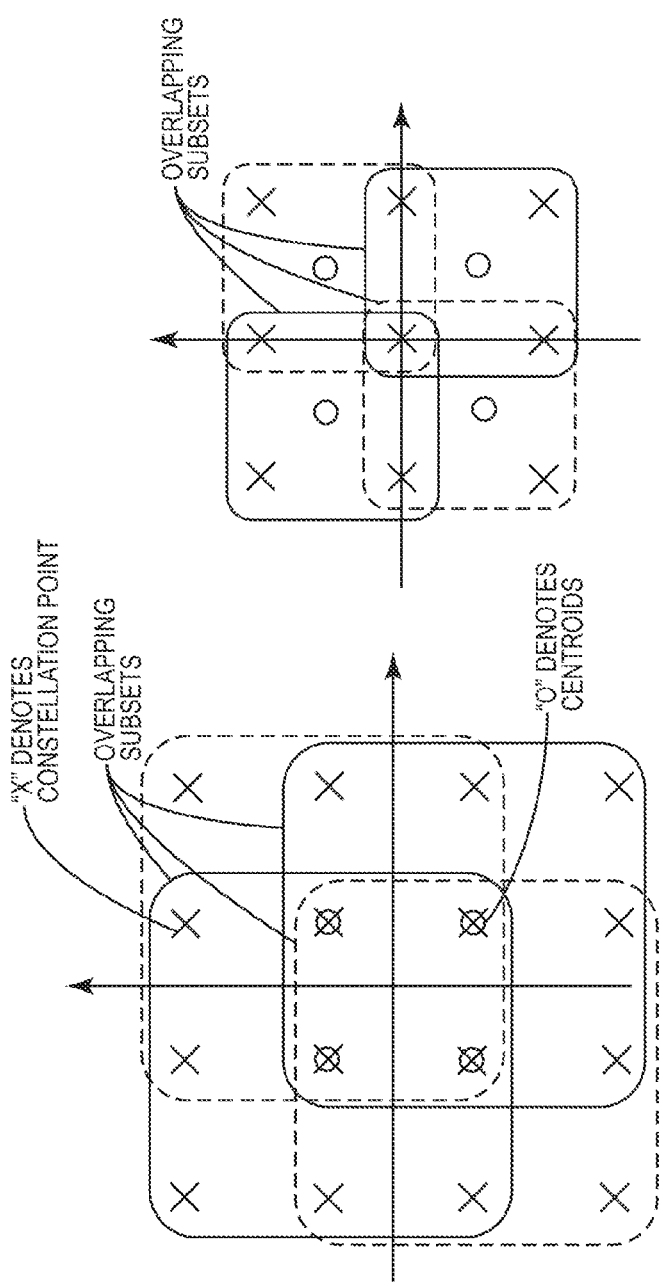
FIGS. 1-3 are example diagrams of known modulation constellations and subset mappings used for SLIC receiver processing.
Figure 2:
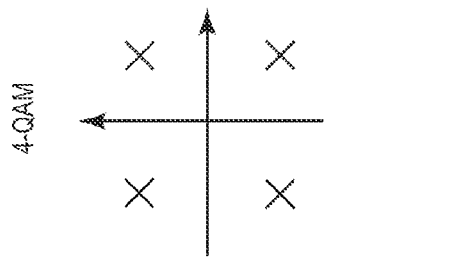
Figure 3:
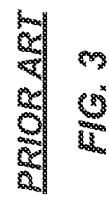
Figure 4:
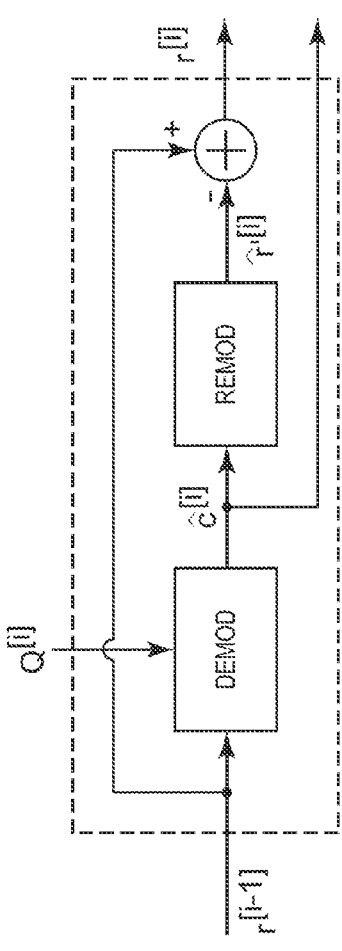
FIGS. 4 and 5 are example diagrams of known arrangements for conventional SLIC receivers.
Figure 5:
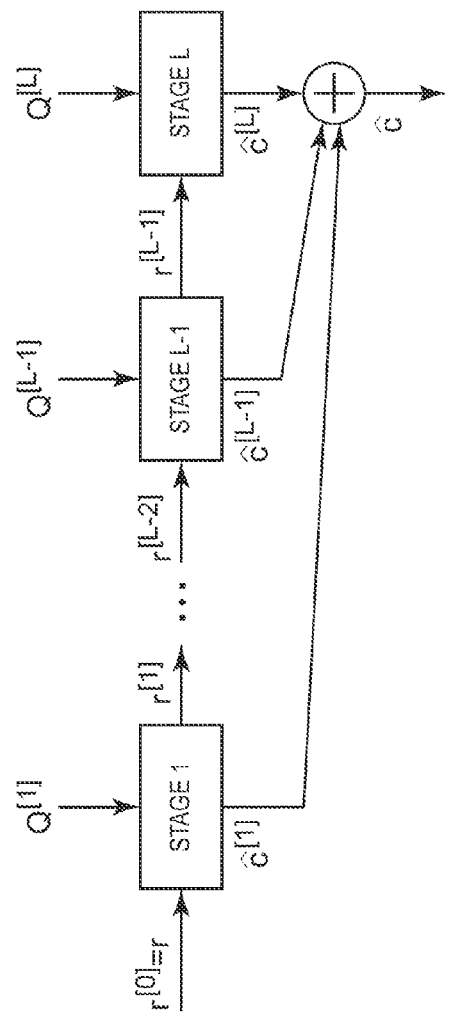
Figure 7:
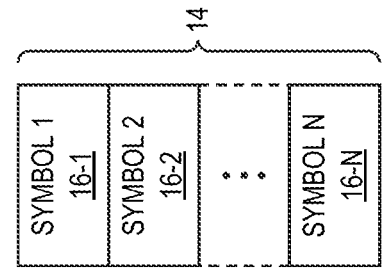
FIG. 7 is a diagram of a typical received symbol vector, such as might be conveyed on multiple streams in a MIMO signal, in a multi-coded signal, etc.

With the above in mind, FIG. 7 depicts an example symbol vector 14 of symbols 16, e.g., such as may exist in the buffered data available to the receiver processing circuits 24 for one or more symbol times of the received composite signal 12. Correspondingly, according to the further example details of FIG. 8, the receiver ("RX") processing circuits 24 in one embodiment include at least a front-end (RF) circuit 30 that generates a received signal 32 that corresponds to the antenna-received composite signal 12. The received signal 32 is also denoted as the received signal "r" in the subsequent mathematical formulae and it will be understood that the received signal 32 conveys the received symbol vector 14.

Figure 8:
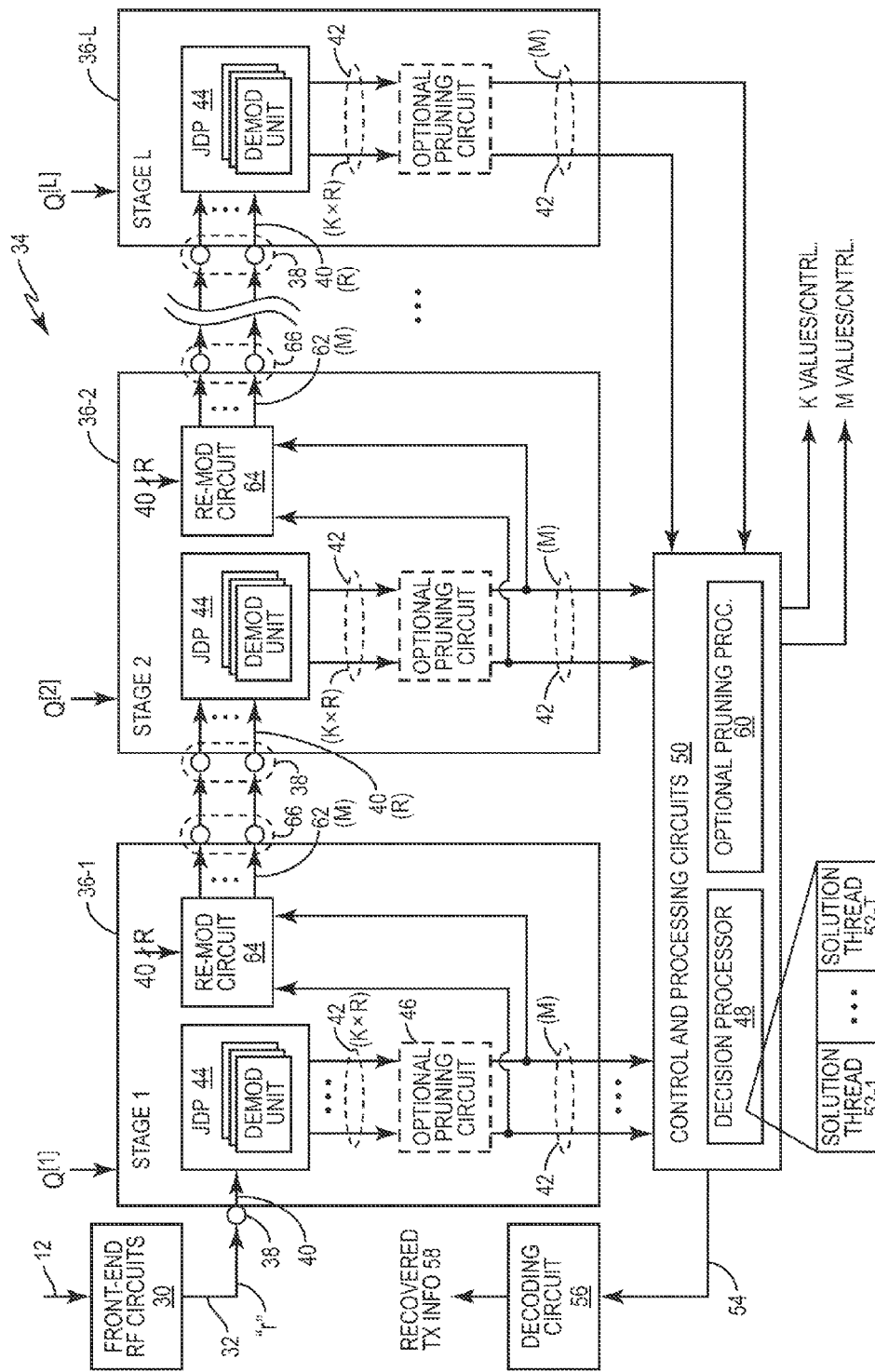
FIG. 8 is a block diagram of one embodiment of a SLIC receiver implemented in the wireless communication apparatus of FIG. 6, for example.

The RX processing circuits further include a SLIC receiver 34 which in general has two or more stages 36, and which in the example of FIG. 8 has stages 36-1, 36-2, . . . , 36-L. The stages 36 also may be referred to as "stage 1," "stage 2," and so on. Each stage 36 includes one or more stage inputs 38, for receiving one or more stage input signals 40. For the first stage 36-1, there is one stage input signal 40, namely, the received signal 32. The number of stage input signals 40 received by any one of the subsequent stages 36 depends on the number of stage decision vectors 42 that are output from/used by the immediately prior stage 36. Notably, in contrast to conventional SLIC receivers as discussed in the Background of this document, one or more stages 36 of the SLIC receiver 34 output multiple stage decision vectors 42, e.g., more than one stage decision vector $\hat{c}^{[i]}$, of the type described in the Background of this document.

In simple terms, in one embodiment contemplated herein, any given stage 36 of the SLIC receiver 34 produces K stage decision vectors 42 for each stage input signal 40 applied to the stage 36. Letting R denote the number of stage input signals 40 received by a given stage 36, then a joint detection processor 44—e.g., a joint demodulation circuit—generates K stage decision vectors 42 for each one of the R stage input signals 40, yielding K×R stage decision vectors 42. Letting R=2 and K=2 as non-limiting examples for a given stage 36, the joint detection processor 44 of the given stage 36 would generate 2×2=4 stage decision vectors 42.

Optionally, however, each stage 36 includes a pruning circuit 46 that is configured to "prune" the actual number of stage decision vectors 42 that are output from and used by the stage 36 to some number M. In the trivial case, M=K×R, meaning that the raw number of stage decision vectors 42 generated by the joint detection processor 44 is the number output from and used by the given stage 36. Omitting or disabling the pruning circuit 46, or setting M to the value of K×R, achieves the trivial case.

In a more meaningful example, M is some number less than K×R, meaning that the number of stage decision vectors 42 that are output from and used by the stage 36 is less than the raw number generated by the joint detection processor 44. For example, assume that K×R=8, and that M is set to a value of four. As such, the stage 36 outputs and uses four stage decision vectors 42, rather than eight. For example, pruning may select the "best" four stage decision vectors 42. As an example, the "best" stage decision vectors 42 are identified in terms of their probabilities or some metric related thereto, for example.

In relation to the above explanation, it will be appreciated that the joint detection processor 44 of each stage 36 may include a single demodulation unit that performs a joint demodulation for each stage input signal 40. That is, when R>1, meaning that there is more than one stage input signal 40 to be demodulated by the stage 36, the joint detection processor 44 can use its demodulation unit to jointly demodulate the multiple stage input signals 40 one at a time. Alternatively, as is suggested in the illustration, the joint detection processor 44 may be equipped, at least functionally, with multiple instances of a joint demodulation unit, where each instance jointly demodulates a different one of the R stage input signals 40.

As a further note regarding the above-explained operations, the phrases "output from" and "used by" warrant further explanation. First, each given stage 36 outputs M stage decision vectors 42. The value of M is fixed as a matter of design in one embodiment; in another embodiment it is set as a configuration value; and in yet another embodiment it is dynamically varied as an operating parameter. As a further extension to any one of these embodiments, the value of M is not necessarily the same for each stage 36.

In any case, for each stage 36, the value of M represents the number of stage decision vectors 42 that are output from the stage 36 for evaluation by a decision processor 48 that is included in control and processing circuits 50. As will be explained later herein, the decision processor 48 forms "solution threads" 52—e.g., 52-1, . . . , 52-T, where T is >1—from different combinations of stage decision vectors 42 taken across all stages 36. That is, each solution thread 52 represents a different combination of stage decision vectors 42 taken across all stages 36 and formed by selecting a particular one of the M stage decision vectors 42 output from each stage 36.

The decision processor 48 evaluates these solution threads 52 to determine a final, overall demodulation solution for the received symbol vector 14, denoted in the diagram as the "best" candidate symbol vector 54. An associated decoding circuit 56 decodes the (soft) bit information comprising the best candidate symbol vector 54 to obtain recovered transmit information 58.

As for the number M of stage decision vectors 42 output from each stage 36, without pruning, the value of M at each stage 36 equals K×R. In other words, without pruning, the number of stage decision vectors 42 output from the given stage 36 equals the raw number (K×R) of stage decision vectors 42 that is generated by the joint detection processor 44 of the stage 36, with the joint detection processor 44 generating K such stage decision vectors 42 for each one of the R stage input signals 40. With pruning, K×R>M, and it will be understood that pruning offers an advantageous way to limit "fan out" as processing moves through the successive serial stages 36, by selecting at each given stage 36 only the M best stage decision vectors 42.

Fan-out also may be controlled via the value of K. As with the value of M, the value of K may be fixed or configurable, or dynamically varied as an operating parameter, and may or may not be the same value across all stages 36 of the SLIC receiver 34. Indeed, it is an aspect of one or more embodiments herein to use different values of K and/or M for different stages 36. The control and processing circuits 50 are, for example, configured to provide each stage 36 with one or more signal(s) indicating the value(s) of K and/or M to be used by the stage 36. In one such embodiment, the control and processing circuits 50 include a pruning processor 60 that controls the operation of the pruning circuits 46 in the stages 36, e.g., enabling/disabling pruning and/or providing the value(s) of M to be used by each such pruning circuit 46.

In any case, M stage decision vectors 42 are "output from" each stage 36. At a minimum, M=1, and for at least one stage 36 of the SLIC receiver 34, M>1. Correspondingly, each stage 36 also "uses" the M stage decision vectors 42 to produce M stage output signals 62 that are propagated to the next stage 36, serving as the R stage input signals 40 for that next stage 36. That is, the value of M at stage 36-(i−1) determines the number of stage output signals 62 that are propagated to the next stage 36-i, and hence determines the number R of stage input signals 40 received by stage 36-i.

Each stage output signal 62 that is output by a given stage 36 is a modified version of a corresponding one of the R stage input signals 40 that is input to that stage 36. More particularly, each stage output signal 62 is a function of a particular one of the M stage decision vectors 42 output from the stage 36, which in turn represents a stage-specific joint symbol decision for the received symbol vector 14 determined from a particular one of the R stage input signals 40.

A re-modulation circuit 64 included in each but the last stage 36-L provides the M stage output signals 62 from corresponding stage outputs 66. Note that the re-modulation circuit 64 in each stage 36 also receives the R stage input signals 40 input to the stage 36. Using a temporary notation for this explanation, assume that a given one of the M stage decision vectors 42 output from a given stage 36-$i$ is denoted as $\hat{c}^{[i]}(m|r^{[i-1]}(r))$, where "m" indicates the m-th one of the stage decision vectors 42 and where $r^{[i-1]}(r)$ denotes the r-th one of the stage input signals 40 from which $\hat{c}^{[i]}(m|r^{[i-1]}(r))$ was derived. Furthermore, for each output $\hat{c}^{[i]}(m|r^{[i-1]}(r))$, there is an associated corresponding metric, which can be written explicitly as $$D(\hat{c}^{[i]}(m|r^{[i-1]}(r))|r^{[i-1]}(r),R^{[i]}), \quad (13)$$

Continuing with the temporary notation, the corresponding re-modulated signal may be denoted as $\hat{r}^{[i]}(m|r^{[i-1]}(r))$, which is generated by the re-modulation circuit 64 as $$\hat{r}^{[i]}(m|r^{[i-1]}(r)) = H\hat{c}^{[i]}(m|r^{[i-1]}(r)), \quad (14)$$

where H as before denotes the channel estimates. Then, the corresponding stage output signal 62, denoted here as 62-$m$, is formed by subtracting the re-modulated signal $\hat{r}^{[i]}(m|r^{[i-1]}(r))$ from the particular stage input signal $r^{[i-1]}(r)$. That is, each one of the M stage output signals 62 is formed as $$r^{[i]}(m) = r^{[i-1]}(r) - H\hat{c}^{[i]}(m|r^{[i-1]}(r)), \quad (15)$$

which is fed to the next stage 36-($i$+1). (The above temporary notation is not used going forward.)

One aspect of the present invention therefore can be understood as a generalization of the SLIC structure, based on allowing multiple solutions to survive, in the form of multiple values of the state $\hat{s}^{[i-1]}$. The SLIC receiver 34 provides this feature by allowing the joint detection processor 44 of a given stage 36 to produce multiple solutions—i.e., to generate multiple stage decision vectors 42. At the next stage 36, those multiple solutions are fed to parallel instances, for example, of the demodulation units included within the joint detection processor 44, each with a different input corresponding to a different solution.

As a result, the SLIC receiver 34 effectively creates a tree structure with as many levels as there are stages 36. To keep the total complexity manageable, the SLIC receiver 34 may perform pruning of the solution tree, by comparing the multiple solutions generated at each stage, and keeping a fixed number of best solutions, in the manner of the M-algorithm.

One may thus generalize the joint detection processor 44 at each stage 36 by enabling its full search using the metric $D(\hat{c}^{[i]}|r^{[i-1]},R^{[i]})$ to output the best K solutions for $\hat{c}^{[i]}$ in $(Q^{[i]})^N$, instead of just the best one. Furthermore, to each of those K solutions out of a demodulation unit, there is an associated corresponding metric. If pruning is applied at the present stage i, then the totality of solutions for $\hat{c}^{[i]}$ from all the demodulation units at stage i are compared on the basis of their associated metrics. The M best solutions for $\hat{c}^{[i]}$ are kept, and the other solutions are discarded.

The above generalization changes how the SLIC 34 operates in comparison to known SLIC receivers, and imposes a tree structure. Starting from stage 1 (36-1), where the stage input signal 40 is r, there are K output values for $\hat{c}^{[1]}$. For clarity, from here on this disclosure uses explicit indexing, showing the indices of the solutions from all the previous stages. In particular, the K output values from the first stage 36-1 are denoted as $\hat{c}^{[1]}(k_1)$ for $k_1=1, \ldots, K$.

To accommodate these K values, one may generalize stage 2 (stage 36-2) accordingly, with K instances of the stage 2 joint detection processor 44 operating in parallel—e.g., parallel joint demodulation units, each operating on one of the solutions from stage 1. For clarity, the parallel instances are depicted as parallel demodulation units in, e.g., FIG. 8.

Each of the K stage 2 demodulation units corresponds to a different value of the state $\hat{s}^{[1]}(k_1) = \hat{c}^{[1]}(k_1)$, resulting in a different input value $r^{[1]}(k_1) = r - H\hat{c}^{[1]}(k_1)$. That is, stage 2 unit $k_1$ operates on the stage output signal 40 denoted as $r^{[1]}(k_1)$ from stage 1, and produces a corresponding K output value for $\hat{c}^{[2]}$, which is explicitly denoted $\hat{c}^{[2]}(k_1,k_2)$, for $k_2=1, \ldots, K$. Overall, there are $K^2$ values for $\hat{c}^{[2]}$ out of stage 2, assuming that stage 1 propagates K stage output signal 62 to stage 2 and that stage 2 generates the same number K stage decision vectors 42 for each one of those K stage output signals 62 received by stage 2 as stage input signals 40—one will recognize from the earlier notation of FIG. 8 that when the number M of stage output signals 62 propagated from a given prior stage 36 equals the number K of stage decision vectors 42 generated by that given prior stage 36, then the number R of stage input signals 40 received by the next stage 36 will equal the value of K of the given prior stage 36. In any case, for stage 2 in this example, each stage decision vector 42 at stage 2—denoted as $\hat{c}^{[2]}(k_1,k_2)$—corresponds to a value of the state $\hat{s}^{[2]}(k_1,k_2) = \hat{c}^{[1]}(k_1) + \hat{c}^{[2]}(k_1,k_2)$.

Because of the overlap of SLIC subsets, some of the state values $\hat{s}^{[2]}(k_1,k_2)$ may coincide. While pruning may be applied, for now one may assume that all solutions are kept at each stage 36, meaning that M=K at each stage 36, and that R at one stage 36 equals K at the prior stage 36. Thus, continuing in the same vein, there are $K^{i-1}$ values of the state $\hat{s}^{[i-1]}$ after stage i−1, denoted $\hat{s}^{[i-1]}(k_1, \ldots, k_{i-1})$. There are also $K^{i-1}$ values of the modified received value $$r^{[i-1]}(k_1, \ldots, k_{i-1}) = r^{[i-2]}(k_1, \ldots, k_{i-2}) - \quad (16)$$
$$H\hat{c}^{[i-1]}(k_1, \ldots, k_{i-1})$$
$$= r - H\hat{s}^{[i-1]}(k_1, \ldots, k_{i-1})$$

To accommodate these values, each stage i provides a corresponding number of parallel demodulation units, such as shown in FIG. 8. Stage demodulation unit $(k_1, \ldots, k_{i-1})$, accepts $r^{[i-1]}(k_1, \ldots, k_{i-1})$, and produces K values of $\hat{c}^{[i]}$, denoted $\hat{c}^{[i]}(k_1, \ldots, k_i)$, for a total of $K^i$ values. After Stage i, at the output of unit $(k_1, \ldots, k_{i-1})$, the new state can be written as $$\hat{s}^{[i]}(k_1, \ldots, k_i) = \hat{s}^{[i-1]}(k_1, \ldots, k_{i-1}) + \hat{c}^{[i]}(k_1, \ldots, k_i). \quad (17)$$

Figure 9:
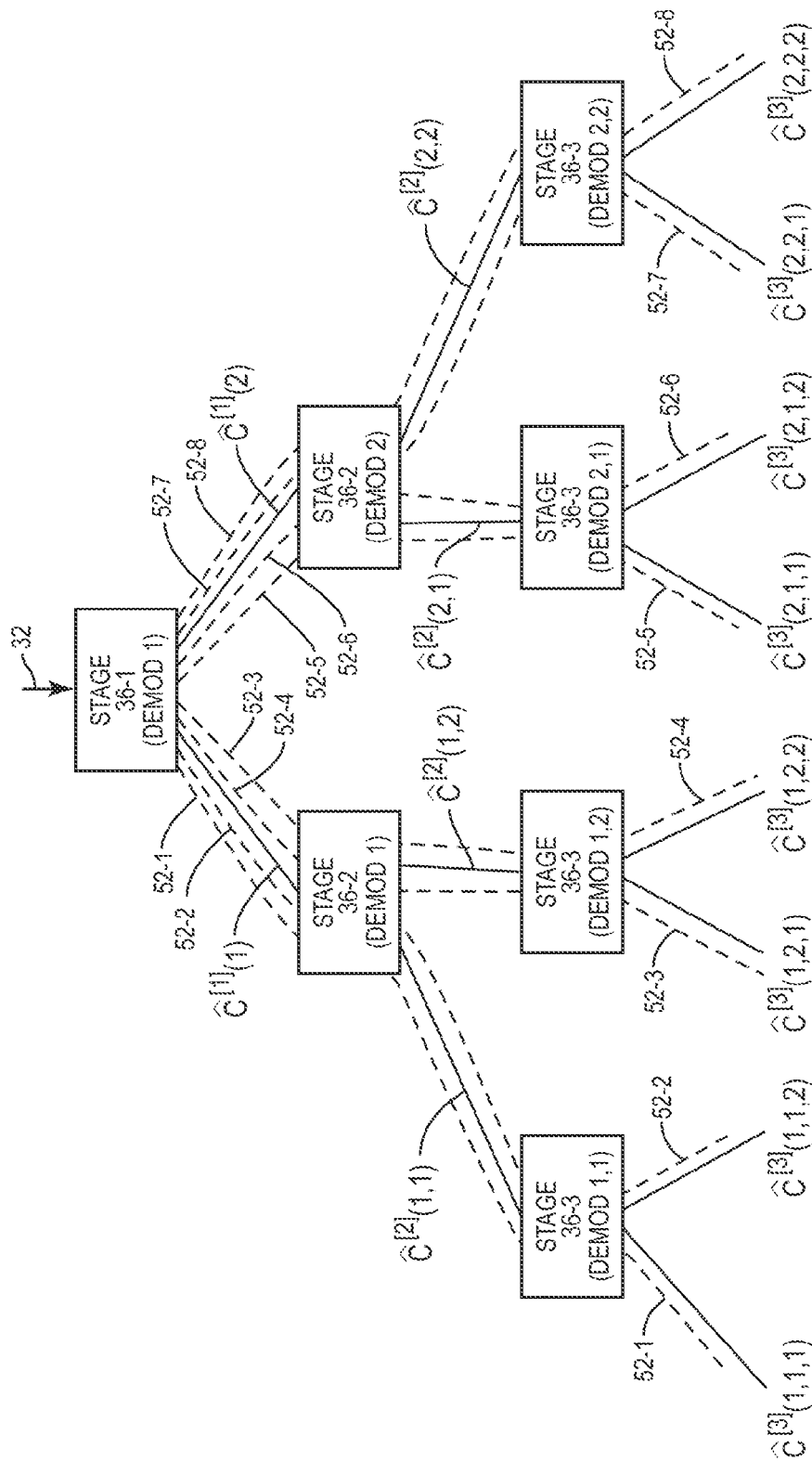
FIG. 9 is a block diagram further illustrating the relationship between different decision threads and stage-specific decisions, for a SLIC receiver that produces multiple stage decision vectors at one or more of its stages.

Note that the indices $(k_1, \ldots, k_{i-1})$ tell exactly how the SLIC receiver 34 got to that point. Hence it is helpful to view the whole process as a K-ary tree structure with L levels, where L is the number of stages 36. FIG. 9 illustrates an un-pruned tree for L=3 and K=2.

After the last stage 36, the SLIC receiver 34 chooses the best value of $\hat{c}[L]$ among the $K^L$ solutions. The overall solution, i.e., the overall candidate symbol decision made by the SLIC receiver 34 for the received symbol vector 14 is given by $$\hat{c} = \hat{s}^{[L]}(k_1, \ldots, k_L) = \hat{s}^{[L-1]}(k_1, \ldots, k_{L-1}) + \hat{c}^{[L]}(k_1, \ldots, k_L) \quad (18)$$

for the value of the state $\hat{s}^{[L-1]}(k_1, \ldots, k_{L-1})$ of the corresponding Stage L demodulation unit $(k_1, \ldots, k_{L-1})$.

As noted above, the state values may coincide due to SLIC subset overlap. Since the same value of the state will produce the same results going forward, the SLIC receiver 34 is configured in at least one embodiment to prune duplicates to avoid redundant computations. Pruning states with constrained tree search offers a further mechanism to avoid complexity. In practice, at any stage 36 of the SLIC receiver 34, few states have a chance to produce the eventual overall solution ĉ (i.e., the best one 54 among the candidate symbol vectors 74), based on the metric of their corresponding solutions.

Recall that at stage i, demodulation unit $(k_1, \ldots, k_{i-1})$ produces K outputs $\hat{c}^{[i]}(k_1, \ldots, k_{i-1})$. For each value $\hat{c}^{[i]}(k_1, \ldots, k_i)$, the SLIC receiver 34 associates the corresponding metric from the demodulation unit $(k_1, \ldots, k_{i-1})$ with the corresponding state $\hat{s}^{[i]}(k_1, \ldots, k_i)$. The SLIC receiver 34 is configured in one or more embodiments to compare the metrics, and keep a fraction of the state values with the smallest metrics, and discard the rest. This approach maintains a manageable complexity while allowing the most promising state values to survive.

The above approach to pruning represents a breadth-first constrained search algorithm, where candidates for pruning belong to the same level in the tree. Thus, the SLIC receiver 34 may implement the M-algorithm to perform such pruning. As is known by those skilled in the art, the M-algorithm is a breadth first constrained search whose breadth is controlled by a parameter M. At any stage, if there are more than M surviving state values, the SLIC receiver 34 keeps only the best M values. After the last stage L, the SLIC receiver 34 chooses the best value of $\hat{c}^{[L]}$ among the M solutions. The overall solution is given by $\hat{c} = \hat{s}^{[L-1]} + \hat{c}^{[L]}$ as before.

Recall that K is the number of surviving candidates after a search by the joint detection processor 44 in a given stage 36. However, it can be beneficial to vary the value of K For instance, the value of K can depend on the stage number—i.e., the serial position of a given stage 36 within the overall series of stages 36 in the SLIC receiver 34. In particular, the SLIC receiver 34 may use different values of K at successive stages 36 to obtain the same fraction of candidates that survive at any stage, so we can choose K for stage i to be a fraction of $(q^{[i]})^N$.

Also as noted, the SLIC receiver 34 also may vary the value of the breadth parameter M across two or more stages 36. In particular, the SLIC receiver 34 may use larger values for M, thus increasing stage numbers, so that latter stages 36 in the series operate with a larger number of surviving solutions.

Figure 10:
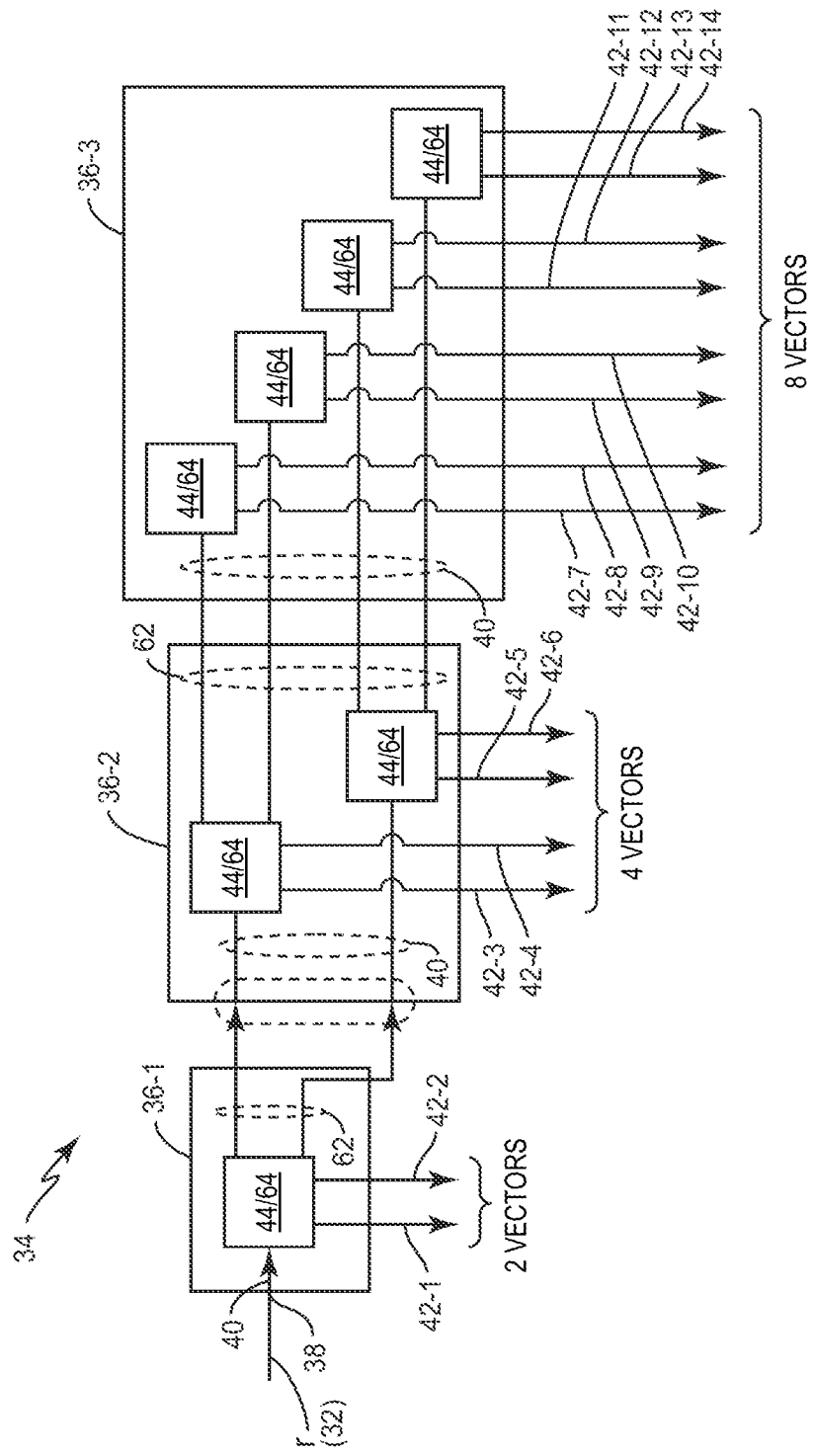
FIG. 10 is a block diagram of another embodiment of a SLIC receiver, including particular details for a three-stage example configuration.

FIGS. 10 and 11 illustrate a non-limiting example of how multiple survivor solutions from one or more stages 36 of the SLIC receiver 34 lead to multiple solution paths or threads 52 through the series of stages. FIG. 10 depicts three stages 36-1, 36-2, and 36-3 (L=3). Further, one may assume that there is no pruning and that K equals two at each of the stages 36. Thus, each stage 36 generates two stage output signals 62 for every stage input signal 40 received by the stage 36. As such, stage 36-1 generates two stage decision vectors 42, and correspondingly outputs two stage output signals 62, each one corresponding to a respective one of the stage decision vectors 42 and a respective one of the stage input signals 40.

The second stage 36-2 receives the two stage output signals 62 from the first stage 36-1 as its stage input signals 40 and generates two stage decision vectors 42 for each stage input signal 40, meaning that in total it produces four stage decision vectors 42 and four corresponding stage output signals 62. In turn, the third stage 36-3 receives the four stage output signals 62 from the second stage 36-2 as its stage input signals 40 and generates two stage decisions 42 for each such stage input signal 40. The third stage 36-3 therefore generates a total of eight stage decision vectors 42, and the overall SLIC receiver 34 produces a total of fourteen stage decision vectors 42, two from the first stage 36-1, four from the second stage 36-2, and eight from the third stage 36-3.

FIG. 11 illustrates that each unique combination of these stage decision vectors 42 represents a different solution thread 52 running through the series of stages 36 (and through a particular demodulation unit in each such stage 36). That is, each solution thread 52 represents a different combination of stage decision vectors 42 taken across the series of stages 36, with one stage decision vector 42 taken from each such stage 36. The control and processing circuits 50 of the SLIC receiver 34 may form as many solution threads 52 as there are different combinations of stage decision vectors 42 across the stages 36. FIG. 11 depicts solution threads 52-1 through 52-U, where U≥2.

In general, each solution thread 52 has L members corresponding to the L stages 36 of the SLIC receiver 34, where each such member is one stage decision vector 42 from a respective one of the stages 42. As a general proposition, two or more solution threads 52 may share one or more common members, but each solution thread 52 has an overall combination of output stage decision vectors 42 that is different from the remaining solution threads 52. The total number of solution threads 52 therefore is less than or equal to the total number of unique combinations of the individual stage decision vectors 42 taken across the set of serial stages 36 in the SLIC receiver 34. Each such solution thread 52 will be recognized as representing a different decision path through the SLIC receiver 34, each such path comprising the accumulation of different decision states across the stages 36.

As shown in FIG. 12, the decision processor 48 computes a candidate symbol vector 74 for each solution thread 52, e.g., for threads 52-1, 52-2, and so on, the decision processor 48 computes candidate symbol vectors 74-1, 74-2, and so on. Each candidate symbol vector 74 has one or more corresponding candidate symbol vector ("CSV") metrics 76, which indicate how well the candidate symbol vector 74 matches or otherwise corresponds to the actual received symbol vector 14. The decision processor 48 uses the CSV metrics 76, for example, to select the best one of the candidate symbol vectors 74 as the best candidate symbol vector 54 shown in FIG. 8, representing an overall demodulation solution for the received symbol vector 14.

Figure 13:
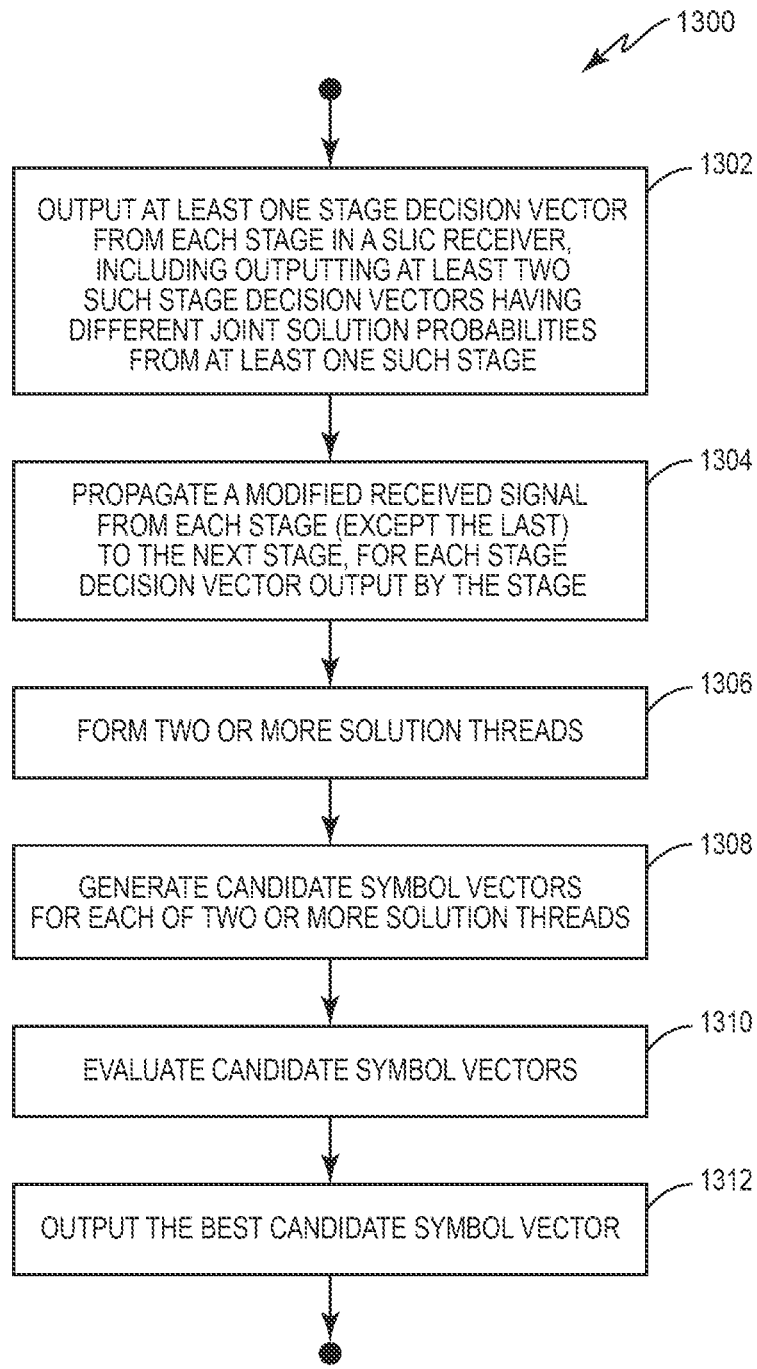
FIG. 13 is a logic flow diagram of one embodiment of a method of demodulating a received symbol vector using SLIC-based demodulation that involves generating and using multiple solution threads.

With the above operations and features in mind, FIG. 13 illustrates one embodiment of a method of implementing multi-survivor SLIC processing. In at least one embodiment, the method is implemented via appropriate configuration of the RX processing circuits 24, including the SLIC receiver 34. The SLIC receiver 34 is implemented in fixed or programmable circuitry, or in some combination thereof. In at least one embodiment, the SLIC receiver 34 is at least partly implemented in baseband processing circuitry, which may comprise one or more Digital Signal Processors (DSPs), microprocessors, or other digital processors, and which are configured at least in part according to the execution of program instructions comprising a computer program stored in a memory circuit or other computer-readable medium included in the circuitry comprising the wireless communication apparatus 10.

In any case, FIG. 13 illustrates a method 1300 of demodulating a received symbol vector 14 conveyed in a received signal 32 using SLIC-based demodulation. In the example illustration, the method 1300 includes outputting (Block 1302) at least one stage decision vector 42 from each stage 36 in a series of two or more stages 36 of a SLIC receiver 34, and outputting at least two stage decision vectors 42 from at least one of the stages 36.

Each stage decision vector 42 represents a stage-specific demodulation solution for the received symbol vector (14) according to a stage-specific modulation constellation (effective alphabet $Q^{[i]}$). That is, each stage decision vector 42 corresponds to a different joint solution for the received symbol vector 14, with respect to a particular one of the stage input signals 40 that are applied to the given stage 36. In at least one embodiment, each stage 36 generates K stage decision vectors 42 for each stage input signal 40 that is applied to the stage 36. With R stage input signals 40 applied (where R may not be the same from stage to stage), there are K×R stage decision vectors 42 generated at a given stage 36, although with pruning (M<K×R), fewer stage decision vectors 42 may be output from and used by the given stage 36.

In any case, it will be understood that each stage decision vector 42 is a vector of candidate symbols selected from the stage-specific modulation constellation(s) $Q^{[i]}$ that are used by each i-th stage 36 to detect symbols 16 in the received symbol vector. Thus, different stage decision vectors 42 represent different joint solutions for the same stage input signal 40, or represent different joint solutions for different ones of the R stage input signals 40.

The method 1300 further includes, for each but the last stage 36, propagating (Block 1304) to the next stage 36 a stage output signal 62 for each one of one or more stage decision vectors 42 output by the stage 36, including forming each stage output signal 62 as a function of a particular one of one or more stage input signals 40 received by the stage 36 and particularly one of the one or more stage decision vectors 42 output by the stage 36 for that particular stage input signal 40.

Here it should be noted that stage output signals 62 are interchangeably referred to herein as "modified received signals 62," in keeping with the fact that each stage output signal 62 is a modified version of a particular stage input signal 40 that is received by the involved stage 36. It should also be noted that the first stage 36-1 in the SLIC receiver 34 receives the received signal 32 as its only stage input signal 40, but each remaining stage 36 receives as its stage input signal(s) 40 the one or more modified received signals 62 propagated from the prior stage 36.

The method 1300 additionally includes forming (Block 1306) two or more solution threads 52, as different combinations of stage decision vectors 42, where the different combinations are formed by taking one stage decision vector 42 from each of stages 36 in the SLIC receiver 34, and the method further includes generating (Block 1308) a candidate symbol vector 74 for at least two of the two or more solution threads 52. Here, the candidate symbol vectors 74, unlike the stage decision vectors 42 from which they are formed, are representations of the symbols 16 in the received symbol vector 14 in terms of the actual modulation constellation(s) associated with their transmission.

Thus, the method 1300 includes evaluating (Block 1310) the candidate symbol vectors 74 to identify a best one of them, denoted as the best candidate symbol vector 54, and outputting (Block 1312) this best candidate symbol vector (54) as an overall demodulation solution for the received symbol vector 14, such as is shown for the example SLIC receiver 34 in FIG. 8.

In one or more embodiments, the set of two or more serial stages 36 comprises L stages (36). Thus, forming each of the two or more solution threads 52 comprises forming a different combination of L stage decision vectors 42 taken across the L stages 36.

Further, in one or more of the same or other embodiments, the method 1300 includes propagating from a given stage 36 at least two modified received signals 62 representing different stage decision vectors 42 made for the same stage input signal 40 that is input to the given stage 36. The method in such embodiments further includes the next stage 36 generating at least one stage decision vector 42 for each one of the at least two modified received signals 62 propagated from the given stage 36.

Further, in one or more of the same or other embodiments, the method 1300 includes pruning to reduce the number of stage decision vectors 42 output by a given stage 36, thereby correspondingly reducing the number of modified received signals 62 propagated from the given stage 36 to the next stage 36, in the case that the given stage 36 is not the last stage 36-L. Pruning at the given stage 36 includes generating a first number of stage decision vectors 42 and discarding one or more of those generated stage decision vectors 42, to obtain a reduced number of stage decision vectors 42 that are output from the given stage 36 for use in forming one or more solution threads 52 and that are used by the given stage 36 to generate the modified received signals 62 propagated to the next stage 36.

In an example case, the given stage 36 generates K×R stage decision vectors 42, where R equals the number of stage input signals 40 applied to the given stage 36 and K equals the number of stage decision vectors 42 that are generated per stage input signal 40. A pruning processor 60 controls a pruning circuit 46 to retain only M of the K×R stage decision vectors 42, where M is an integer and is, for active pruning, less than K×R. Indeed, particularly with fan-out at the latter stages 36, M may be significantly less than K×R at such stages 36.

As one example, pruning includes evaluating quality metrics corresponding to the generated stage decision vectors 42, e.g., at any given stage 36 and with respect to any given one or ones of the corresponding stage input signals 40, and discarding one or more lower-quality ones of the generated stage decision vectors 42, to obtain the reduced number of output stage decision vectors 42. Because the quality metrics indicate something about the probabilities that the stage decision vectors 42 are the correct solution for the received symbol vector 14, they may be used to rank a plurality of stage decision vectors 42, and to select only a subset of the best ones to effect pruning.

Further, assuming that the given stage 36 being pruned is not the first stage 36-1, pruning in one or more embodiments includes discarding any of the generated stage decision vectors 42 that correspond to duplicate decision states from the preceding stages 36. In this regard, it will be appreciated that each stage input signal 40 that is input to any given stage 36 beyond the first stage 36-1 represents a particular decision state of the SLIC receiver 34, as accumulated in the corresponding solution thread 52 running through all prior stages 36.

Further, in one or more of the same or other embodiments, pruning includes varying the number of stage decision vectors 42 permitted to be output from any given stage 36 based on the serial position of the stage (36) within the set of two or more serial stages 36.

More generally, in one or more of the same or other embodiments, the method 1300 includes varying the number of stage decision vectors 42 generated for each stage input signal 40 that is input to each stage 36 as a function of the serial position of the stage 36 within the set of two or more serial stages 36.

Further, in one or more of the same or other embodiments, the method 1300 includes generating the stage decision vectors 42 output by at least one stage 36 of the SLIC receiver 34 using a constrained tree search. A constrained tree search searches a reduced space as compared to a full or unconstrained tree search, and thus offers the advantage of reduced computational complexity and greater efficiency.

Further, in one or more of the same or other embodiments, the one or more stage decisions 42 output by each stage 36 are generated using a joint detection processor 44 that includes one or more demodulation units and that determines each stage decision vector 42 as a joint solution representing the received symbol vector 14. This joint solution, as explained before, comprises a vector of symbols selected from the stage-specific modulation constellation $Q^{[i]}$ in use by each stage 36-$i$.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A Serial Localization with Indecision (SLIC) receiver configured to demodulate a received symbol vector in a received signal, said SLIC receiver comprising:
   a set of two or more serial stages, wherein each stage is configured to output at least one stage decision vector representing a stage-specific demodulation solution for the received symbol vector according to a stage-specific modulation constellation, and each stage except for a last stage is configured to propagate to a next stage one or more modified received signals, each modified received signal comprising, if the stage is the first stage, the received signal as modified by the stage to account for a particular one of the at least one stage decision vector output by the first stage, and otherwise comprising one of the one or more modified received signals propagated from the prior stage as modified by the stage to account for a particular one of the at least one stage decision vector output by the stage for said one of the one or more modified received signals propagated from the prior stage; and
   wherein at least one stage in the SLIC receiver outputs at least two such stage decision vectors, such that SLIC receiver produces at least two solution threads, with each such solution thread comprising a different combination of the stage decision vectors taken across the set of two or more serial stages; and
   wherein said SLIC receiver further comprises a decision processor that is configured to generate two or more candidate symbol vectors from respective ones of two or more of the solution threads, each such candidate symbol vector representing an overall demodulation solution for the received symbol vector, identify a best one of the candidate symbol vectors, and output the best candidate symbol vector as the overall demodulation solution.

2. The SLIC receiver of claim 1, wherein the set of two or more serial stages comprises L stages, L≥2, and wherein each of the two or more solution threads comprises a different combination of L-stage decision vectors taken across the L stages.

3. The SLIC receiver of claim 1, wherein at least one of the stages is configured to receive multiple modified received signals propagated from the prior stage, referred to as stage input signals with respect to the stage, and to propagate multiple modified received signals to the next stage, referred to as stage output signals with respect to the stage, and wherein the stage is configured to include in said stage output signals at least two different stage output signals corresponding to different stage decision vectors determined for the same stage input signal.

4. The SLIC receiver of claim 1, wherein the SLIC receiver further includes a pruning processor that is configured to reduce the number of stage decision vectors output by one or more of the stages in said SLIC receiver based on, for a given stage that is configured to generate multiple stage decision vectors, discarding at least one such generated stage decision vector, to thereby reduce the number of stage decision vectors that are output by the given stage and, in the case that the given stage is not the last stage, to correspondingly reduce the number of modified received signals that are propagated from the given stage to the next stage.

5. The SLIC receiver of claim 4, wherein the pruning processor or an associated pruning circuit is configured to reduce the number of stage decision vectors output by a given stage that is configured to generate two or more such stage decision vectors, by evaluating quality metrics corresponding to the two or more stage decision vectors generated by the given stage and discarding one or more lower-quality ones of the stage decision vectors generated by the given stage, so that the given stage outputs fewer stage decision vectors than were generated and, if the given stage is not the last stage, correspondingly propagates modified received signals to the next stage only for the stage decision vectors that were not discarded.

6. The SLIC receiver of claim 4, wherein the given stage is not the first stage and wherein the pruning processor or the associated pruning circuit is configured to discard any generated stage decision vectors from the given stage that correspond to duplicate decision states from the preceding stages.

7. The SLIC receiver of claim 4, wherein the pruning processor is configured to vary the number of stage decision vectors permitted to be output from any given stage based on the serial position of the stage within the set of two or more serial stages.

8. The SLIC receiver of claim 1, wherein the SLIC receiver is configured to vary the number of stage decision vectors that are generated from each stage input signal input to any given stage, based on the serial position of the stage with the set of two or more serial stages, wherein the first stage receives the received signal as its sole stage input signal, and each subsequent stage receives as its one or more stage input signals the one or more modified received signals output from the prior stage.

9. The SLIC receiver of claim 1, wherein at least one stage of the SLIC receiver is configured to use a constrained tree search for determining the at least one stage decision vector output by the stage.

10. The SLIC receiver of claim 1, wherein each stage includes:
    a set of one or more stage inputs, each configured to receive a stage input signal that is the received signal if the stage is the first stage and is otherwise one of the one or more modified received signals output by the prior stage; and
    a joint detection processor having one or more demodulation units and configured to generate at least one stage decision vector for each stage input signal; and
    wherein the joint detection processor of at least one stage is configured to generate more than one stage decision vector for at least one of the stage input signals.

11. A method of demodulating a received symbol vector conveyed in a received signal using Serial Localization with Indecision (SLIC) based demodulation, said method implemented in a SLIC receiver and comprising:

outputting at least one stage decision vector from each stage in a series of two or more stages of the SLIC receiver, each stage decision vector representing a stage-specific demodulation solution for the received symbol vector according to a stage-specific modulation constellation, including outputting from at least one of said stages two or more stage decision vectors;

for each but the last stage, propagating to the next stage a modified received signal for each one of the stage decision vectors the at least one stage decision vector output by the stage, including forming each said modified received signal as a function of a particular one of one or more stage input signals received by the stage and a particular one of the at least one stage decision vector output by the stage for that particular stage input signal, wherein the first stage receives the received signal as its stage input signal, and wherein each remaining stage receives the one or more modified received signals propagated from the prior stage as its one or more stage input signals;

forming two or more solution threads as different combinations of stage decision vectors, said different combinations formed by taking one stage decision vector from each of the stages in the SLIC receiver;

generating a candidate symbol vector for at least two of the two or more solution threads;

evaluating the candidate symbol vectors to identify a best one of the candidate symbol vectors; and outputting the best candidate symbol vector as an overall demodulation solution for the received symbol vector.

12. The method of claim 11, wherein the set of two or more serial stages comprises L stages, L≥2, and wherein forming each of the two or more solution threads comprises forming a different combination of L stage decision vectors taken across the L stages.

13. The method of claim 11, wherein the method includes propagating from a given stage at least two modified received signals representing different stage decision vectors made for the same stage input signal that is input to said given stage, and further includes the next stage generating at least one stage decision vector for each one of said at least two modified received signals propagated from the given stage.

14. The method of claim 11, further comprising pruning to reduce the number of stage decision vectors output by a given stage, thereby correspondingly reducing the number of modified received signals propagated from the given stage to the next stage, in the case that the given stage is not the last stage, wherein pruning at the given stage includes generating a first number of stage decision vectors and discarding one or more of those generated stage decision vectors to obtain a reduced number of stage decision vectors that are output from the given stage and used by the given stage to generate the modified received signals propagated to the next stage.

15. The method of claim 14, wherein said pruning includes evaluating quality metrics corresponding to the generated stage decision vectors and discarding one or more lower-quality ones of the generated stage decision vectors, to obtain the reduced number of output stage decision vectors.

16. The method of claim 14, wherein the given stage is not the first stage and wherein said pruning includes discarding any of the generated stage decision vectors that correspond to duplicate decision states from the preceding stages.

17. The method of claim 14, wherein said pruning includes varying the number of stage decision vectors permitted to be output from any given stage based on the serial position of the stage within the set of two or more serial stages.

18. The method of claim 11, further comprising varying the number of stage decision vectors generated for each stage input signal that is input to each stage as a function of the serial position of the stage within the set of two or more serial stages.

19. The method of claim 11, further comprising generating the at least one stage decision vector output by at least one stage of the SLIC receiver using a constrained tree search.

20. The method of claim 11, wherein the at least one stage decision vector output by each stage are generated using a joint detection processor that includes one or more demodulation units and that determines each stage decision vector as a joint solution representing the received symbol vector, said joint solution comprising a vector of symbols selected from the stage-specific modulation constellation.

21. The method of claim 11, wherein each stage input signal input to any given stage beyond the first stage represents a particular decision state of the SLIC receiver, as accumulated in the corresponding solution thread running through all prior stages.

* * * * *

UNITED STATES PATENT AND TRADEMARK OFFICE
CERTIFICATE OF CORRECTION

PATENT NO.       : 8,750,432 B2
APPLICATION NO.  : 13/545630
DATED            : June 10, 2014
INVENTOR(S)      : Khayrallah et al.

It is certified that error appears in the above-identified patent and that said Letters Patent is hereby corrected as shown below:

In The Specification

In Column 4, Line 4, Equation (10), delete "$r^{[i]}=r-H(\hat{c}^{[1]}+\ldots+\hat{c}^{[i-1]})=r-H\hat{s}^{[i-1]},$" and insert -- $r^{[i]}=r-H(\hat{c}^{[1]}+\ldots+\hat{c}^{[i-1]})=r-H\hat{s}^{[i-1]}$ --, therefor.

In Column 8, Line 59, delete "Mat" and insert -- M at --, therefor.

In Column 9, Line 23, Equation (14), delete "$\hat{r}^{[i]}(m|r^{[i-1]}(r))=H\hat{c}^{[i]}(m|r^{[i-1]}(r)),$" and insert -- $\hat{r}^{[i]}(m|r^{[i-1]}(r))=H\hat{c}^{[i]}(m|r^{[i-1]}(r)),$ --, therefor.

In Column 9, Line 30, Equation (15), delete "$r^{[i]}(m)=r^{[i-1]}(r)-H\hat{c}^{[i]}(m|r^{[i-1]}(r)),$" and insert -- $r^{[i]}(m)=r^{[i-1]}(r)-H\hat{c}^{[i]}(m|r^{[i-1]}(r)),$ --, therefor.

In Column 10, Line 9, delete "$r^{[1]}(k_1)=r-H\hat{c}^{[1]}(k_1).$" and insert -- $r^{[1]}(k_1)=r-H\hat{s}^{[1]}(k_1).$ --, therefor.

In Column 10, Line 10, delete "output signal 40" and insert -- output signal 62 --, therefor.

In Column 11, Line 33, delete "K For" and insert -- K. For --, therefor.

In Column 11, Line 64, delete "second stage 62-2" and insert -- second stage 36-2 --, therefor.

In Column 12, Line 19, delete "stages 42." and insert -- stages 36. --, therefor.

Signed and Sealed this
Thirteenth Day of January, 2015

Michelle K. Lee
*Deputy Director of the United States Patent and Trademark Office*

CERTIFICATE OF CORRECTION (continued)
U.S. Pat. No. 8,750,432 B2

In The Claims

In Column 17, Lines 13-14, in Claim 11, delete "of the stage decision vectors the at" and insert -- of the at --, therefor.